3,368,871
FLUIDIZED BED PROCESS FOR THE PREPARATION OF COLLOIDAL SILICON CARBIDE
Thomas L. O'Connor, Dedham, and Wayne A. McRae, Lexington, Mass., assignors to Ionics, Incorporated, Watertown, Mass.
Continuation-in-part of application Ser. No. 473,202, July 19, 1965. This application Dec. 5, 1966, Ser. No. 599,157
10 Claims. (Cl. 23—208)

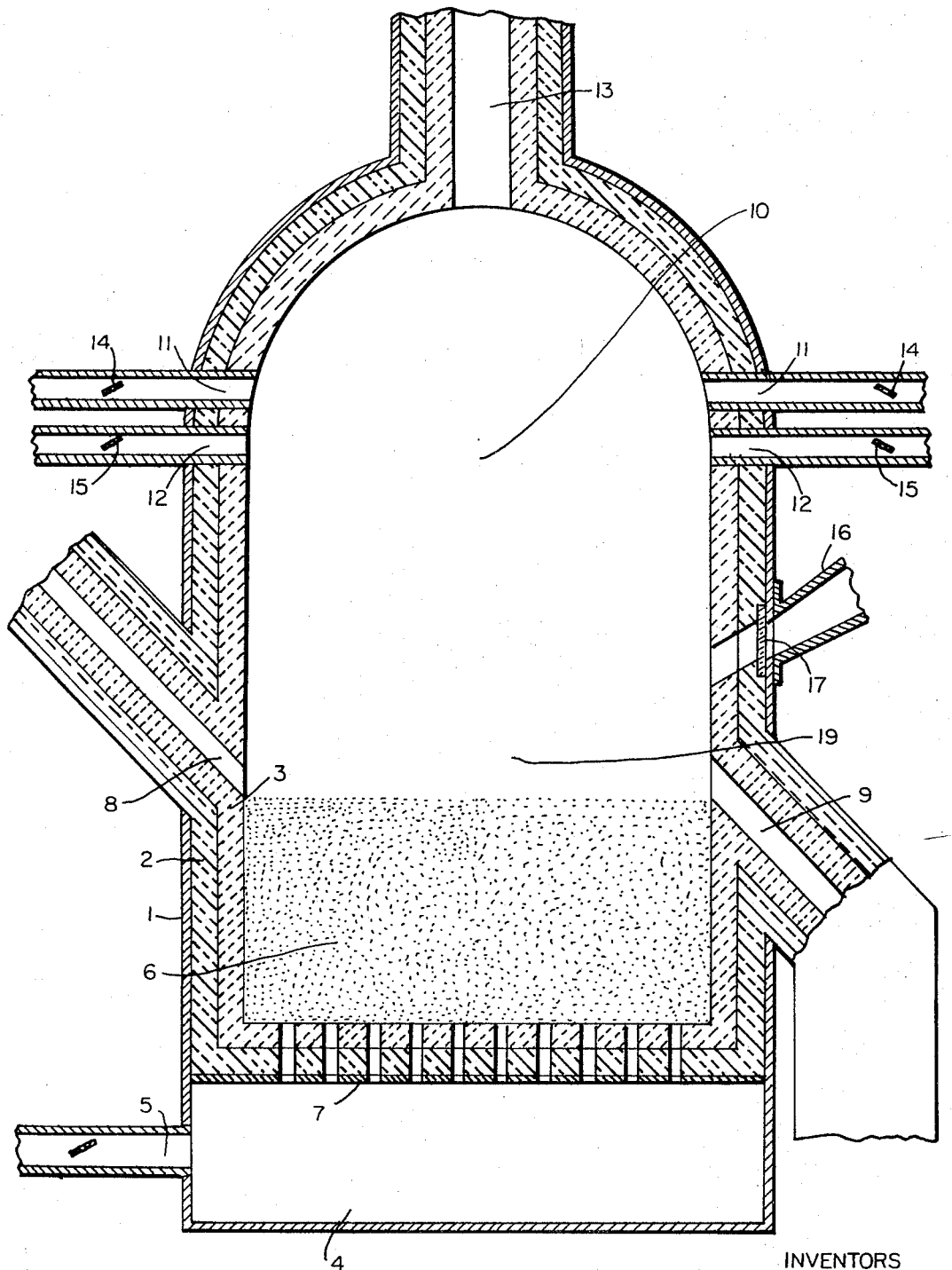

ABSTRACT OF THE DISCLOSURE

A method of making white silicon carbide particles in a fluidized bed reactor having a lower, middle and upper zone, the process comprising reacting particles of carbon and a silicon compound in the lower fluidized bed zone and removing the silicon carbide product from the middle discharge zone. The heat necessary for maintaining the reaction occurring in the fluidized bed zone is obtained primarily from heat radiated from the upper combustion zone where exothermic combustible materials are reacted in the presence of oxygen.

---

This application is a continuation-in-part of copending application Ser. No. 473,202, filed July 19, 1965, said copending application being a continuation-in-part of application Ser. No. 457,900, filed Apr. 27, 1965, and now abandoned. Ser. No. 457,900 was a division of application Ser. No. 284,836, filed June 3, 1963, now U.S. Patent No. 3,236,673, granted on Feb. 22, 1966. Application Ser. No. 284,836 was filed as a continuation-in-part of parent application Ser. No. 844,193, filed Oct. 5, 1959, and now abandoned.

This invention relates to methods of making white silicon carbide compositions having particles of optical size. More particularly, sources of silicon are reacted with sources of carbon under proper conditions and controls to produce a silicon carbide composition of controlled average particle size (100 to 1,000 millimicrons) and controlled amounts of trace elements which, when suspended in proper vehicles or polymers, produce substantially white hiding coating compositions.

It is well known that pigment hiding power (i.e., ability to hide a given surface with a minimum amount of pigment suspended in a vehicle or polymer), is principally dependent upon the pigment having a high index of refraction and an optical particle size. Silicon carbide has the requisite high index of refraction (2.63), comparable to the two principal white titanium dioxide pigments, anatase and rutile. However, heretofore, it has not been possible to prepare white silicon carbide in the desired optical particle size to render it satisfactory as a white pigment. The usual silicon carbide of commerce is not of optical size and is too dark in color to be satisfactory for this purpose.

Previous references to the use of silicon carbide as a paint or varnish additive do not suggest its use as a prime white hiding pigment but rather show its use in improving the wear and chip resistance of paint or varnish films taking advantage of the hardness of the carbide. The prior art relating to the preparation of silicon carbides does not suggest practical and inexpensive means of preparation of white material nor does it suggest methods of controlling the particle size necessary to the preparation of an efficient pigment.

For example, it has been proposed to incorporate super-optical size pulverized silicon carbide, such as carborundum or quartz-meal into varnish for the purpose of effecting a highly chip resistant coating material for preventing flake-off, shock, splitting when struck or dropped, etc. The average diameter of such pulverized silicon carbide is noted to have been 40,000 to 100,000 millimicrons (U.S. Patent No. 1,950,820) and thus greatly above optical size. It will be noted that the silicon carbide is not a hiding pigment in this use with varnish but rather is an additive for increasing the resistance to shocks and blows often inflicted upon varnish coatings.

It has also been proposed to employ granular silicon carbide with proper vehicle as a paint for the express purpose of providing a coating with high abrasion resistance. However, such coating materials were never white (usually associated with white pigmentary hiding titanium and lead paints) but were various dark shades of gray without hiding power. The lack of hiding power is undoubtedly due to the comparatively large silicon carbide particles employed as the pigment material (greater than 10,000 millimicrons and thus of superoptical size) (H. Hesse Seifen V. Anstrichmittel 55, 723, 1953).

The present invention overcomes the above inadequacies and deficiencies in the preparation and use of optical size silicon carbide particles as a white hiding pigment. Accordingly, this invention is directed to the method of making a pigmentary silicon carbide composition of a substantially white grade, which when mixed or incorporated with a proper vehicle, forms a white paint finish, coating or film of extremely high hiding ability. The silicon carbide composition of this invention may be formed substantially colorless (as later defined), and with an average particle diameter size in the range of 100 to 1,000 millimicrons with the particles produced preferably by a high temperature fluidized bed furnace. A particle size in the optical range, that is, between about 100 and about 1,000 millimicrons is desired but preferably the range should be between 200 and 500 millimicrons. It is also desirable that the silicon carbide composition be optically compensated or have the proper electronic configuration; that is, for example, having minor impurities of the third and/or eighth column of the Periodic Table substantially compensated by impurities of the fifth column of the Periodic Table. A mass of such particles has good hiding power and appears substantially white in color. It has a high index of light refraction and relatively good reflection and is comparable in these respects to titanium dioxide.

Comparative tests measured against a standard of magnesium oxide indicate the applicants' composition is equal to titanium dioxide as a white pigment. Titanium dioxide of high quality reflects upward of 80 percent of light as compared with magnesium oxide. Experimental quantities of a silicon carbide composition of the type described by the applicants have been found comparable to titanium dioxide, reflecting upward of 80 percent of the light with no more than a 20 percent variation over the entire visible spectrum. As defined herein, the reflectance or whiteness of the silicon carbide composition of this invention is comparable to the reflectance or whiteness of titanium dioxide of high quality. Titanium dioxide has a high index of refraction and relatively good reflectance with respect to magnesium oxide which is conventionally used as a standard of whiteness. Titanium dioxide of high quality reflects upwards of 80 percent of light as compared with magnesium oxide with no more than a 20 percent variation over the entire visible light spectrum.

Accordingly, the invention relates to a method or process of making a silicon carbide composition of the type described. Silicon carbide particles cannot be readily formed in the desired range of 100 to 1,000 millimicrons by abrasive or fracturing means in view of the unusual hardness of silicon carbide. However, it has been discovered in this invention that a silicon carbide composition may be made in such particle sizes with the necessary trace elements by heating an intimate mixture of finely divided silicon containing material with an excess of carbonaceous material to a temperature of about 1,350° C. and below 1,750° C. in a sweep gas for a predetermined period of time. By properly controlling the particle size of the starting material and other reaction parameters, a silicon carbide composition of average particle diameter size in the optical range, that is, from about 100 to about 1,000 millimicrons may be produced directly. The mass which is heated to the range of from 1,350° C. to 1,750° C. is cooled and the excess carbon is gasified at elevated temperatures to complete the process. As indicated, a preferred method of practicing this invention contemplates using a fluidized bed technique for effecting the reaction. Use of carbon in the form of carbon black and silica in the form of quartz is also preferred.

An object of the present invention is to provide a novel procedure for making large quantities of substantially white silicon carbide particles in the optical size range by a fluidized bed technique.

Further objects of the present invention will appear from the following more detailed disclosure of this invention.

In the process of the present invention, a source of silicon, such as elemental silicon, silicon monoxide, quartz, sand, silicic acid, silica gel, colloidal or amorphous silica (silica sol), etc., is reacted at elevated temperatures with relatively pure carbon. The carbon may be obtained, for example, from methane or other hydrocarbons, petroleum coke, charcoal, etc. The temperature of the reaction is maintained within the range of about 1,350° C. to about 1,750° C. and preferably between 1,400° C. to 1,600° C.

Although in the present disclosure a substantially white silicon carbide composition is produced from the purest commercially available materials, as a practical matter such starting materials have some impurities. Thus, for example, there will usually be traces of iron, phosphorus, nitrogen, vanadium, boron, aluminum or rare earths in either starting material even through such materials is considered commercially pure. The sweep gas will usually contain traces of nitrogen. Traces of such substances even in amounts of only a few parts per million in either starting material or the sweep gas will discolor the silicon carbide composition produced unless such substances are deliberately compensated by other substances. It has been found that such starting materials as elemental silicon, silicon monoxide, quart, sand, silicic acid, silica gel, colloidal or amorphous silica, and carbon, which as indicated often have traces of impurities of the third column (including the rare earths) and/or the eight column of the Periodic Table, may be compensated by impurities of the fifth column of the Periodic Table and where the impurities are of the fifth column of the Periodic Table they may be electronically compensated by the addition of impurities of the third and/or eighth columns of the Periodic Table. For example, the presence of iron (eighth column) as a contaminant in either of the starting materials imparts a greenish tint to the silicon carbide product, but this green color can be compensated by controlling the amount of nitrogen, phosphorous or vanadium (fifth column) in the raw materials and the sweep gas to substantially compensate for the iron content of the silicon carbide composition. The materials of construction of the reactor may also contribute trace elements which must be compensated.

As used herein, a material is "colorless" when all wave lengths within the visible spectrum are reflected from the material with a variation of reflection of any given wave length within the visible spectrum not differing by substantially more than 10 percent from the mean value of reflection. A material may be gray even though it is colorless depending upon its ability to absorb light. Where a material absorbs 100 percent of all the light waves in the visible spectrum, it will appear black and will appear gray with lesser degrees of absorption. In order for colorless particles of the silicon carbide composition to appear substantially white, they must therefore also have a high degree of reflection. A reflection of 80 percent of visible light waves as compared with magnesium oxide with substantially no more than a variation of about 20 percent over the entire visible light spectrum is considered by experts in the art to be a high degree of reflection.

As used herein, a material is compensated when the trace elements which give rise to hole conduction and to electron conduction are in substantial balance in an otherwise substantially pure material so as to make the material appear colorless. Thus, for example, silicon carbide having a concentration of $10^{-6}$ atom fraction of aluminum may be compensated by a concentration of about $10^{-6}$ atom fraction of nitrogen. Thus, the silicon carbide of this invention is not a pure compound in the sense of an intrinsic semiconductor but is a composition consisting of a substantially major proportion of silicon carbide and substantially minor proportions of trace elements, the latter elements in a compensating relationship to each other. By way of illustration, such trace elements generally seem to fall into one of two classes: trivalent electropositive elements such as those of Colum III (including the rare earths) and Column VIII of the Periodic Table; and the trivalent electronegative elements such as those of Column V of the Periodic Table. Electropositive elements of particular importance are boron, aluminum and iron while electronegative elements of particular importance are nitrogen, phosphorus and vanadium.

In order to obtain the desired average particle size of the silicon carbide composition of from about 100 to about 1,000 millimicrons whereby substantially white particles of excellent hiding power are obtained, the use of a fluidized bed apparatus, preferably of the type disclosed hereinafter, is employed in the novel process of the present invention. It is to be understood that the fluidized bed apparatus as disclosed in the present case is not by itself the invention of the present case, but rather the process steps for producing silicon carbide of a desired size and characteristics is believed new, novel and inventive herein.

In the schematic illustration of the fluidized bed reactor, 1 is a gas tight steel shell which encloses the entire area of the reactor of the invention, together with insulating brick layer 2 and a refractory brick layer 3. The fluidizing gas is passed through inlet 5 into windbox 4 wherefrom it passes through the fluidized bed 6 forming a fluidized bed zone which is contained by the supporting structure 7. Above the low fluidized bed zone is a middle discharging or disengaging zone 19 for the fluidized bed. The approximate upper third of the fluidized bed reactor contains the combustion zone 10 wherein the exothermic reaction takes place. Ducts 11 and 12 serve to introduce reactant fluids into the combustion zone and duct 13 is a gas exhaust. Duct 8 serves to introduce feed solids into the fluidized bed and duct 9 is an overflow outlet for product solids. Valves 14 and 15 serve to regulate the flow of reactant gases into the reactor. Pyrometer 16 sights onto the top surface of the fluidized bed via a water or air-cooled transparent window 17. However, any suitable means of temperature measurement may be used. All ducts will be necessarily provided with gas seals.

In the general method of operating this invention, a fluidizing gas such as methane is injected into the reactor through inlet 5, such gas being determined by the nature of the reaction taking place in the fluidized bed reactor but being preferably of either a combustible nature or an oxidant nature. However, alternatively, it may be of an inert nature as, for example, an inert gas such as argon, helium, etc. or a gas such as hydrogen, methane, etc. which is inert to the basic reaction taking place in the fluidized bed but a desirable component of the combustion effected in the upper combustion area. The combustible fluids that may be conveniently employed are, for example, hydrogen-containing gases, hydrocarbon gases, fuel oils, etc.

Concurrently with the introduction of the fluidizing gas, the reactant material or materials are introduced into the fluidized bed, such materials generally being combustible in cases where the fluidizing gas or gas leaving the fluidized bed, is of an oxidant nature and oxidant in cases where the fluidizing gas or equivalent is of a combustible or reducing nature. Where the fluidizing gas is inert, the materials introduced above the bed contain both combustible and oxidant agents, or any group of agents that will induce an exothermic reaction in the upper space above the fluidized bed. The heat of the reaction is radiated in all directions, but is reflected and/or reemitted by the refractory bricks of the reactor shell and is absorbed by the cooler turbulent surface of the fluidized bed wherein it is rapidly diffused. The products of the reaction are swept upward and away from the fluidized bed.

Constancy of temperature of the bed can be maintained by means of regulation of the temperatures of the various elements introduced into the reactor and by means of regulation of the quantities of reactant gases introduced into the combustion zone 10 or space above, thereby controlling the amount of energy radiated to the fluidized bed by the exothermic reaction. In this manner, a predetermined temperature may be maintained by controls (not shown) such that the total energy entering the bed by means of radiation and other means, such as that contained in the influent solids or fluidizing gases, is equal to the total energy escaping from the bed by any means, such as heat contained in the product solids, heat contained in the fluidizing gases leaving the bed, and heat losses through the walls surrounding the bed.

It is to be noted that the desired average particle size of the white pigmentary silicon carbide composition of the present invention is between about 100 and about 1000 millimicrons and preferably between about 200 and about 500 millimicrons. The ideal particle size seems to be about 225 millimicrons, that is, about one-half the wave length of red light. Silicon carbide compositions having particle sizes smaller than about 100 millimicrons or larger than about 1,000 millimicrons have not been found to have satisfactory hiding power.

Other things being equal, the time of reaction of the starting materials if too short results in particle sizes too small, and if the reaction time is too long, the particle sizes of the reaction product are too large. Other variables, such as the particle sizes and character of the starting materials and temperature of the reaction, also affect the product size obtained in a given time period. It has been found that the carbon and silicon containing feed materials should have an average particle size less than about 100,000 millimicrons. It was found that withdrawing samples at frequent intervals from the reactor and measuring the particle size would very easily and effectively determine the end of the reaction to produce the average particle sizes desired. In practice, this time interval varied from about five minutes to about two hours. Withdrawing such samples also provides a means for observing and controlling the compensation of trace elements in the silicon carbide composition.

It is preferred that the proportions of starting materials be such that there is an excess of carbon. The resulting excess after the reaction may then be removed by heating in air, dry air, carbon dioxide, steam or oxygen or other oxygen-containing gas at temperatures of about 900° C. forming volatile carbon oxides. It has been found that a white, optically sized silicon carbide composition may be produced using about 0.1 to about 10 moles of excess carbon per mole of silicon in the SiC produced.

The white pigmentary silicon carbide of particle sizes of this invention may then be intimately dispersed in well-known vehicles or carriers, such as solutions or dispersions of plasticizers, solvents, drying oils (such as inseed oil, tung oil, fish oil, etc.), natural and synthetic resins (such as alkyd, epoxy or polyurethane resins), latex and mixtures thereof, to produce the white paints, coating and finishes of the present invention. The usual driers, thinners, gelling agents, viscosity conditioners, tints and other well-known additives may also be dispersed or dissolved in such vehicles in the usual way. An additional use of the silicon carbide of the present invention is a pigment to give whiteness to plastic material (polyethylene, polyvinylchloride, etc.) which are fabricated in the form of containers, tile, etc.

The following examples illustrate the preferred mode of carrying out the invention and the novel product obtained.

EXAMPLE 1

Five hundred grams of pure quartz (—325 mesh) was placed in a 2 inch diameter fluidized bed reactor in a stream of methane gas. The fluidized bed reactor constiutes approximately the lower third of a vertical shaft furnace. The middle third of the furnace is a discharging zone for the fluidized bed while the upper third is a combustion zone for supplying heat to the fluidized bed. The mixture was heated to 1,450° C., and it was found from tests of extracted samples that about thirty minutes were sufficient to produce optical size silicon particles. The reaction is endothermic and required a stream of methane passing through the windbox of the reactor at a velocity of about 30 to about 100 feet per minute, whereby the cracking of the methane in the fluidized bed produced hydrogen, which upon reaction with oxygen admitted into the upper combustion zone of the furnace, produced the heat in the form of radiant energy necessary for maintaining the reaction in the fluidized bed. The reaction product was cooled in argon to 900° C. Air was blown through to oxidize excess carbon. The silicon carbide discharged from the bed was substantially white. The particle size was about 250 millimicrons and the tinting strength, compared to anatase titanium dioxide pigment, was 125 percent.

EXAMPLE 2

A 50 percent mixture by weight of commercially pure silicic acid and commercially pure carbon black having an average particle size of less than 100,000 millimicrons is placed in the fluidized reactor of Example 1 and heated to 1,400° C.–1,575° C. by the combustion of hydrogen gas with oxygen gases in the upper third zone thereof. This reaction is highly exothermic. The hydrogen gas is employed as the fluidizing gas at a velocity of about 50 feet per minute to sustain the charged bed in a fluidized state. Several extracted samples were checked to ascertain the time required to form the desired average particle size of the silicon carbide composition. The time interval of the reaction is about one hour. The tube is cooled in an atmosphere of hydrogen to below 1,000° C. and the product removed is then heated in dry air to 800° C.–900° C. to burn off unreacted carbon. Unreacted silica is removed by volatilization of $SiF_4$ by treatment with a mixture of hydrofluoric and sulfuric acids. The product had an average size of about 500 millimicrons and is of a satisfactory white color; that is, it has a reflectance of more than 80 percent of visible light as compared with magnesium oxide with no more than a variation of 20 percent over the entire visible spectrum. The tinting strength of this material is about 90 percent of a commercial anatase titanium dioxide according to A.S.T.M. standard test designation, D332–36. (A.S.T.M. Standards, 1946, Part II, published by American Society for Testing Materials, Philadelphia, Pa.)

What is claimed is:

1. A process for producing silicon carbide particles in a fluidized bed substantially by radiation in a reactor consisting of a lower fluidized bed zone, a middle disengaging of discharge zone, and an upper combustion zone, comprising:
(a) introducing endothermic reacting particles into said fluidized bed zone of said reactor, said particles comprising granular carbon and silicon containing compounds selected from the group consisting of silicon, silicon monoxide, quartz, sand, silicic acid, silica gel and silica sols;
(b) passing a non-oxidizing fluidizing gas upwardly in said lower bed zone to suspend said particles therein, thereby forming the fluidized bed of said reactor;
(c) disengaging said particles from said fluidizing gas prior to passing said fluidizing gas out of said lower bed zone;
(d) introducing exothermic reactant combustible materials into said upper combustion zone and reacting the same exothermically in said zone, the heat from said reaction being transferred substantially by radiation to said lower fluidized bed;
(e) simultaneously withdrawing the products of said combustion from said upper combustion zone and removing the silicon carbide product of said endothermic reaction from said discharging or disengaging zone without substantial contamination of the silicon carbide with the exothermic reaction products.

2. The process of claim 1 wherein the exothermic reactant combustible materials are introduced directly into the upper combustion zone of said fluidized reactor.

3. The process of claim 2 wherein at least one of the exothermic reactant combustible materials introduced into the upper combustion zone is a fuel oil and at least one other exothermic reactant combustible material is air.

4. The process of claim 1 wherein an exothermic reactant combustible material is a component of the fluidizing gas.

5. The process of claim 1 wherein the combustible material is selected from the group consisting of hydrogen, carbon monoxide, and natural gases.

6. The process of claim 1 wherein the fluidized bed comprises a mixture of quartz and carbon in particulate form.

7. A process for producing silicon carbide particles in a fluidized bed reactor having a lower fluidized bed zone, a middle discharging zone and an upper combustion zone comprising:
(a) introducing into said fluidized bed zone, particles of a silicon containing compound selected from the group consisting of silicon, silicon monoxide, quartz, sand, silicic acid, silica gel and silica sols,
(b) passing a stream of hydrocarbon gas upwardly through said fluidized bed zone at a velocity sufficient to suspend said silicon containing particles thereon,
(c) maintaining said fluidized bed at a temperature sufficient to form silicon carbide and to cause cracking of said hydrocarbon gas into carbon and a combustible gas,
(d) disengaging particles in said fluidized bed from said combustion gas prior to said gas being passed into the upper combustion zone of the reactor,
(e) exothermically reacting said combustible gas with an oxidant gas in said combustion zone whereby the heat of said reaction is transferred substantially in the form of radiant energy to said lower fluidized bed,
(f) withdrawing the products of said combustion reaction from said combustion zone and removing the silicon carbide product from said discharging zone without substantial contamination from the products of said combustion reaction.

8. The process of claim 7 wherein the silicon containing compound is quartz and the hydrocarbon gas is methane.

9. The process of claim 7 wherein the velocity of the hydrocarbon gas through said fluidized bed zone is about between 30 to 100 feet per minute.

10. The process of claim 7 wherein said oxidant gas is oxygen.

References Cited
UNITED STATES PATENTS

| | | | |
|---|---|---|---|
| 3,205,042 | 9/1965 | Jacobson | 23—208 |
| 3,236,673 | 2/1966 | O'Connor et al. | 23—208 |
| 3,271,109 | 9/1966 | Mezey et al. | 23—208 |

OSCAR R. VERTIZ, *Primary Examiner.*

G. T. OZAKI, *Assistant Examiner.*